XR 3,337,805
CROSS REFERENCE SEARCH ROOM

Aug. 22, 1967 W. T. JOSEPH 3,337,805
RECEIVER SHUTOFF DEVICE
Filed Feb. 5, 1964

INVENTOR.
William T. Joseph
BY
Lockwood, Woodard, Smith & Weikart
Attorneys 3,337,805
RECEIVER SHUTOFF DEVICE
William T. Joseph, 702 Lexington Ave.,
Indianapolis, Ind. 46203
Filed Feb. 5, 1964, Ser. No. 342,706
5 Claims. (Cl. 325—392)

ABSTRACT OF THE DISCLOSURE

A television receiver shutoff device which is controlled by a signal transmitted from the television station at a frequency of between 18 to 19 kilocycles on the station carrier wave. The television receiver power supply circuit is broken by a relay which opens its contacts in the circuit in response to the 18 to 19 kc. signal taken from the voice coil of the audio section of the television receiver.

The present invention relates to a control finding particular utility as a control for a television receiver.

Present-day television sets in many cases are provided with remote control apparatus which makes changing the station and turning the set on and off an easy and convenient operation. Such remote control apparatus or a conventional on-off switch is not effective, however, unless there is someone to actuate the switch. An important object of the present invention is to provide a control apparatus operable to automatically turn off a television set at the end of the day's broadcasting.

Another object of the present invention is to provide an improved control circuit usable in various applications.

Related objects and advantages will appear as the description proceeds.

One embodiment of the present invention might include, in combination with a television receiver, a set of contacts in the power circuit to the receiver, means for opening the contacts to turn off the receiver, said means being responsive to a signal of given frequency on the voice coil of said receiver. Each television station when it finishes programming will transmit a signal of approximately 18 to 19 kilocycles on its carrier wave. The above described structure is adjusted to be responsive to said 18 to 19 kilocycles and to turn off the television set at the time said 18 to 19 kilocycles is received by the set.

The full nature of the invention will be understood from the accompanying drawings and the following description and claims:

Figure 1:
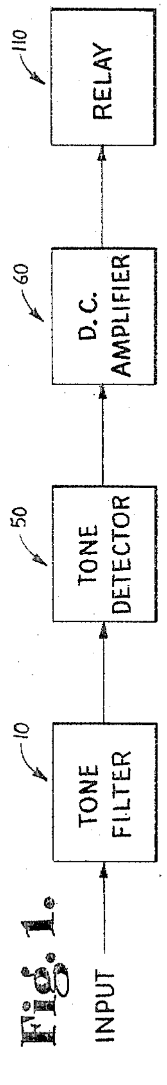
FIG. 1 is a block diagram of the circuit of the present invention.

For the purpose of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
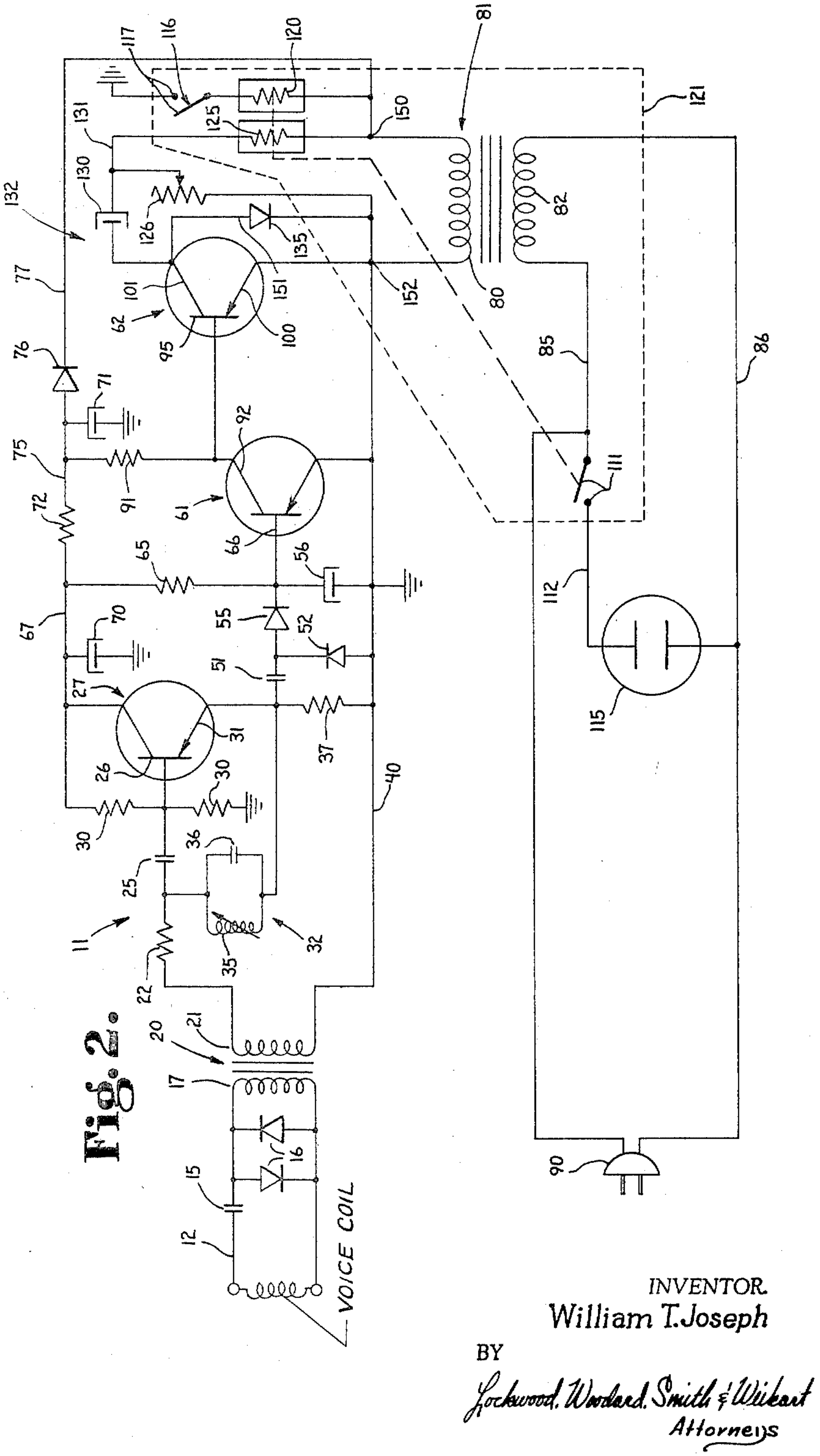
FIG. 2 is an electrical schematic diagram showing further details of the circuit of the present invention.

Referring now more particularly to the drawings, there is illustrated a tone filter 10 which consists of the circuitry indicated generally at 11 in FIG. 2. The leads 12 of FIG. 2 are connected across the voice coil of the television receiver. In series with one lead 12 is a capacitor 15 which in one preferred embodiment of the invention has a rating of 1 mfd. In the remainder of the present description, the various specific values given for components refers to said one preferred embodiment.

Connected across the leads 12 is a pair of oppositely directed diodes 16 which may be 1N295. The purpose of the components 16 is to by-pass all signals of high intensity such as, for example, voice tones and other audible tones on the voice coil and forming a part of the conventional transmitted information. The leads 12 are connected across the primary 17 of an impedance matching transformer 20.

The secondary 21 of the transformer is connected across the tone filter circuitry 11. This circuitry consists of a resistor 22 which may be 4.7K and is connected in series with capacitor 25 which is, in turn, connected in series with the base 26 of a transistor 27 which functions as an amplifier. The transistor 27 may be, for example, a 2N270 and the capacitor 25 may be a .01 mfd. 12K resistors 30 form a part of the biasing circuit for the transistor 27.

Connected across the base and emitter 31 of the transistor 27 is a tuned circuit 32 which consists of an adjustable inductance 35 in parallel with a fixed capacitor 36. The inductance 35 may be variable, for example, between .5 and 3.5 mh. while the capacitance 36 may have a value of .01 mfd. A 1K resistor 37 is connected between ground 40 and the emitter 31 of the transistor 27. The above described circuitry effects a filtering of the input by reason of the tuned circuit 32 which attenuates tones which are outside of the range of 18 to 19 kilocycles and amplifies tones within that range.

The output of the tone filter 10 is fed into a tone detector 50 which includes the capacitor 51, rectifiers 52 and 55 and capacitor 56. The capacitor 51 may have a value of .05 mfd. while the capacitor 56 has a value of 2 mfd. The rectifiers 52 and 55 are each 1N56. The function of the detector 50 is to provide a DC output when the tone of proper frequency is fed into the detector.

The output of the tone detector is fed into a DC amplifier 60 which includes transistors 61 and 62 and associated circuitry. A 6.8K resistor 65 is connected between the base 66 of the transistor 61 and the line 67 and forms biasing means for the transistor 61. The capacitors 70 and 71 which are connected on the opposite sides of resistor 72 form, together with the resistor 72, a filter. The capacitances 70 and 71 may be each 200 mfd. while the resistor 72 is 47 ohms.

A DC bias is provided upon the line 67 and the line 75 by means of rectifier 76 which is connected between the line 75 and the line 77. The DC bias is provided by an alternating current from the secondary 80 of a transformer 81. The transformer secondary 80 is connected between the ground line 40 and the line 77. The primary 82 of the transformer 81 is connected across lines 85 and 86 which are always provided with 60 cycle 120 volt steady AC current from the wall plug 90.

Also forming a part of the biasing circuit for the transistor 61 is a 470 ohm resistor 91 connected between the line 75 and the collector 92 of the transistor 61. The amplified DC output of the transistor 61 is fed into the base 95 of the transistor 62. The varying DC output to the base 95 of the transistor 62 effects amplification of voltage from the emitter 100 to the collector 101. The transistor 61 may be a 2N270 while the transistor 62 may be a 2N441.

The output of the DC amplifier comprising the transistors 61 and 62 is fed into a relay 110. The relay 110 includes a pair of contacts 111 which control current through a line 112 leading from the power supply line 85 to the television receiver 115. The contacts 111 may be closed by the closing of a push button switch 116 which closes the contacts 117 making the circuit through a bimetallic element 120. The bimetallic element 120 is mechanically connected to the contacts 111 in such a manner that the contacts are closed when the bimetallic element is energized. The action of closing of the contacts 111 is toggle-type in nature, in other words a snap action. The details of the structure associated with the circuitry enclosed within the dotted line 121 will not be described because this structure forms a part of a commercially available mechanism, Catalog No. PR–115 manufactured by Pyramid Instrument Corporation of Lynbrook, N.Y.

The toggle or snap action of closure of contacts 111 can be reversed to lock the contacts in open position by energization of a bimetallic element 125. The bimetallic element 125 is connected in series with a sensitivity resistor 126 which is, in turn, connected to ground 40. When the sensitivity resistor is adjusted to a relatively high resistance, only a small amount of current normally flows through the bimetallic element 125 and, therefore, a signal of relatively great intensity is necessary to fully heat the bimetallic element to snap open the toggle-type contacts 111. On the other hand, when the sensitivity resistor 126 is set to relatively low value, only a small amount of additional current through the bimetallic element 125 is required to snap open the contacts 111.

A capacitor 130 having a capacitance of 1,000 mfd. is connected between the resistor 126 and the bimetallic element 125 and more particularly to the line 131 leading therebetween. The capacitor 130 forms a part of an actuating circuit 132 which is in parallel with the sensitivity resistor 126. This actuating circuit includes in addition to the capacitor 130 the transistor 62 which is in series with the capacitor 130 and a rectifier 135 which is in parallel with the transistor 62. The rectifier 135 may be a silicon type GE 504 as may be the rectifier 76.

Assuming now that no input in the 18 to 19 kilocycle range comes into the wires 12, the base 95 will receive no DC signal and consequently, transistor 62 will remain non-conductive. The voltage applied to collector 101 of transistor 62 is obtained from secondary 80 of transformer 81, rectified by rectifier 135 and stored by capacitor 130. As long as transistor 62 is non-conducting, no current flows through bimetallic element 125, after initial charging of capacitor 130, except the small current through sensitivity adjustment resistor 126. Such current will not be great enough to cause the bimetallic element 125 to open the contacts 111.

Due to the integrator action of resistor 65 and capacitor 56, a signal within the specified frequency range must be applied to the input of the device for a sufficient time to charge the capacitor 56 to a point where the voltage applied to the base of transistor 61 triggers that transistor.

Assuming now that sufficient DC is fed to the base 95 of the transistor 62, current will flow from the end 152 of the transformer secondary 80 through the transistor from the emitter 100 to the collector 101 discharging capacitor 130 through bimetallic element 125 back to transformer end 150, when point 152 goes positive. When point 152 goes negative, current will flow from point 150 through bimetallic element 125 charging capacitor 130 through rectifier 135. This current, added to the adjustable smaller amount through resistor 126 will, therefore, increase the current through the bimetallic element 125 to a point at which it will open the contacts 111.

From the above description, it will be evident that the present invention provides means for automatically turning off a television set at the end of the day's programming. It can be appreciated that various other applications for the invention can be conceived, for example, the circuit of the present invention might be used as a part of a burglar alarm.

The invention claimed is:

1. In combination with a radio frequency receiver including an audio section with a voice coil which receives a demodulated signal from an RF carrier, a set of contacts in the power circuit to the receiver, and means for opening said contacts in response to a signal of given frequency on the voice coil of said receiver.

2. In combination with a television receiver including an audio section with a voice coil which receives a demodulated signal from an RF carrier, a control circuit including a tone filter coupled across the voice coil, said tone filter being adjusted to attenuate voice tones and to pass tones of a given range of frequencies, a tone detector coupled to said tone filter and receiving the output thereof, said tone detector providing a DC output when frequencies within said range are fed to it, a DC amplifier coupled to said tone detector and receiving the output thereof, a relay coupled to said DC amplifier and receiving the output thereof, said relay having a set of contacts controlling power to the television receiver and being responsive to a given level of DC signal from said DC amplifier to open said contacts.

3. In combination with a television receiver including an audio section with a voice coil which receives a demodulated signal from an RF carrier, a tone filter coupled across the voice coil, said tone filter including a tuned circuit which is adjustable to pass tones of a given range of frequencies and to attenuate other tones outside of said range, a tone detector coupled to the output of said tone filter, said tone detector incorporating rectifying means whereby said detector provides a DC output when frequencies within said given range are fed to said detector, a DC amplifier coupled to the output of said tone detector and including a transistor, a relay having a pair of contacts controlling power to the television receiver, said relay including a bi-metallic element mechanically associated with said contacts and arranged to open said contacts upon the passing of a given amount of current through said bimetallic element, an AC power supply independent of the power supply to said receiver, said bimetallic element having one side connected to one side of said independent power supply, an adjustable sensitivity resistor having one side connected to the other side of said bimetallic element and having its other side connected to the other side of said power supply, an actuating circuit in parallel with said sensitivity resistor, said actuating circuit consisting of a capacitor in series with a parallel circuit consisting of a rectifier and said transistor.

4. In combination with a television receiver including an audio section with a voice coil which receives a demodulated signal from an RF carrier, input leads connected across the voice coil of the receiver, an impedance matching transformer having said leads connected to the primary thereof, a tone filter coupled to the secondary of said transformer, said tone filter including a tuned circuit which is adjustable to pass tones of a given range of frequencies and to attenuate other tones outside of said range, a tone detector coupled to the output of said tone filter, said tone detector incorporating rectifying means whereby said detector provides a DC output when frequencies within said given range are fed to said detector, a DC amplifier coupled to the output of said tone detector and including a transistor, a relay having a pair of contacts controlling power to the television receiver, said relay including a bimetallic element mechanically associated with said contacts and arranged to open said contacts upon the passing of a given amount of current through said bimetallic element, and AC power supply independent of the power supply to said receiver, said bimetallic element having one side connected to one side of said independent power supply, an actuating circuit having one side connected to the other side of said bimetallic element and having its other side connected to the other side of said power supply, said actuating circuit consisting of a capacitor in series with a parallel circuit consisting of a rectifier and said transistor.

5. In combination with a television receiver including an audio section with a voice coil which receives a demodulated signal from an RF carrier, input leads connected across the voice coil of the receiver, an impedance matching transformer having said leads connected to the primary thereof, a tone filter coupled to the secondary of said transformer, said tone filter including a tuned circuit which is adjustable to pass tones of a given range of frequencies and to attenuate other tones outside of said range, a tone detector coupled to the output of said tone filter, said tone detector incorporating rectifying means whereby said detector provides a DC output when frequencies within said given range are fed to said detector, a DC amplifier coupled to the output of said tone detector and including a transistor, a relay having a pair of contacts controlling power to the television receiver, said relay including a bimetallic element mechanically associated with said contacts and arranged to open said contacts upon the passing of a given amount of current through said bimetallic element, an AC power supply independent of the power supply to said receiver, said bimetallic element having one side connected to one side of said independent power supply, an adjustable sensitivity resistor having one side connected to the other side of said bimetallic element and having its other side connected to the other side of said power supply, an actuating circuit in parallel with said sensitivity resistor, said actuating circuit consisting of a capacitor in series with a parallel circuit consisting of a rectifier and said transistor.

References Cited

UNITED STATES PATENTS

| | | | |
|---|---|---|---|
| 2,683,869 | 7/1954 | Norris et al. -------- | 340—171 |
| 2,817,025 | 12/1957 | Adler ------------- | 340—171 |
| 3,256,515 | 6/1966 | Caprio ---------- | 325—392 X |

KATHLEEN H. CLAFFY, *Primary Examiner.*

R. LINN, *Assistant Examiner.*